(12) United States Patent
Foo

(10) Patent No.: US 10,698,690 B2
(45) Date of Patent: *Jun. 30, 2020

(54) SYNCHRONISATION OF EXECUTION THREADS ON A MULTI-THREADED PROCESSOR

(71) Applicant: Imagination Technologies Limited, Kings Langley (GB)

(72) Inventor: Yoong Chert Foo, London (GB)

(73) Assignee: Imagination Technologies Limited, Kings Langley (GB)

(*) Notice: Subject to any disclaimer, the term of this patent is extended or adjusted under 35 U.S.C. 154(b) by 0 days.

This patent is subject to a terminal disclaimer.

(21) Appl. No.: 16/251,620

(22) Filed: Jan. 18, 2019

(65) Prior Publication Data

US 2019/0155607 A1 May 23, 2019

Related U.S. Application Data

(63) Continuation of application No. 14/177,980, filed on Feb. 11, 2014, now Pat. No. 10,481,911, which is a (Continued)

(30) Foreign Application Priority Data

Jul. 4, 2006 (GB) .................................. 0613289.8

(51) Int. Cl.
*G06F 9/46* (2006.01)
*G06F 9/52* (2006.01)
(Continued)

(52) U.S. Cl.
CPC ........ *G06F 9/30145* (2013.01); *G06F 9/3851* (2013.01); *G06F 9/522* (2013.01); *G06F 9/524* (2013.01); *G06F 8/458* (2013.01); *G06F 9/3009* (2013.01); *G06F 9/30087* (2013.01); *G06F 9/461* (2013.01)

(58) Field of Classification Search
CPC .... G06F 9/30145; G06F 9/3851; G06F 9/522; G06F 9/524; G06F 9/30087;
(Continued)

(56) References Cited

U.S. PATENT DOCUMENTS 5,261,063 A * 11/1993 Kohn .................... G06F 9/3001
712/229
5,504,898 A * 4/1996 Klein .................... G06F 9/4843
718/101
(Continued)

FOREIGN PATENT DOCUMENTS

JP 2003/514274 A 4/2003

*Primary Examiner* — Daniel H Pan
(74) *Attorney, Agent, or Firm* — Potomac Law Group, PLLC; Vincent M DeLuca

(57) ABSTRACT

Method and apparatus are provided for synchronising execution of a plurality of threads on a multi-threaded processor. A program executed by a thread can have a number of synchronisation points corresponding to points where execution is to be synchronised with another thread. Execution of a thread is paused when it reaches a synchronisation point until at least one other thread with which it is intended to be synchronised reaches a corresponding synchronisation point. Execution is subsequently resumed. A control core maintains status data for threads and can cause a thread that is ready to run to use execution resources that were occupied by a thread that is waiting for a synchronisation event.

16 Claims, 3 Drawing Sheets

Related U.S. Application Data continuation of application No. 13/483,682, filed on May 30, 2012, now Pat. No. 8,656,400, which is a continuation of application No. 11/895,618, filed on Aug. 24, 2007, now Pat. No. 8,286,180, which is a continuation-in-part of application No. 11/591,801, filed on Nov. 2, 2006, now abandoned.

(51) Int. Cl.
*G06F 9/30* (2018.01)
*G06F 9/38* (2018.01)
*G06F 8/41* (2018.01)

(58) Field of Classification Search
CPC .... G06F 9/3009; G06F 9/461; G06F 9/30058; G06F 9/4843; G06F 9/485; G06F 8/458
USPC .................. 718/102, 108; 712/228, 234–236
See application file for complete search history.

(56) References Cited

U.S. PATENT DOCUMENTS

| | | | | |
|---|---|---|---|---|
| 5,721,921 | A * | 2/1998 | Kessler | G06F 9/52 370/390 |
| 6,574,725 | B1 | 6/2003 | Kranich et al. | |
| 6,718,484 | B1 * | 4/2004 | Kodera | G06F 11/28 714/12 |
| 6,766,437 | B1 | 7/2004 | Coscarella et al. | |
| 7,366,878 | B1 | 4/2008 | Mills et al. | |
| 7,543,136 | B1 * | 6/2009 | Coon | G06F 9/30181 712/228 |
| 8,286,180 | B2 * | 10/2012 | Foo | G06F 9/3851 718/106 |
| 8,656,400 | B2 * | 2/2014 | Foo | G06F 9/3851 718/102 |
| 2004/0230975 | A1 * | 11/2004 | Gewirtz | G06F 8/458 718/100 |
| 2007/0016905 | A1 | 1/2007 | Rector et al. | |

* cited by examiner

```
Thread #0:
1 process instruction x
2 process if (condition a) (true) -> do nothing
3 encounter sync point, pauses (wait for sync start)

Thread #1:
1 process instruction x
2 process if (condition a) (false) -> jump to end if
3 branched over sync point, pauses (wait for sync end)

Thread #2
1 process instruction x
2 process if (condition a) (true) -> do nothing
3 encounter sync point, pauses (wait for sync start)

Thread #3:
1 process instruction x
2 process if (condition a) (false) -> jump to end if
3 branched over sync point, pauses (wait for sync end)

---equilibrium point---

Thread #0:
4 can resume processing - process instruction y
5 process instruction z Thread #2
4 can resume processing - process instruction y
5 process instruction z Thread #1
4 can resume processing - process instruction z Thread #3:
4 can resume processing - process instruction z
```

FIG. 3

SYNCHRONISATION OF EXECUTION THREADS ON A MULTI-THREADED PROCESSOR

CROSS-REFERENCE TO RELATED APPLICATIONS

This application is a continuation of application Ser. No. 14/177,980 filed Feb. 14, 2014, which is a continuation of application Ser. No. 13/483,682 filed May 30, 2012, now U.S. Pat. No. 8,656,400, which is a continuation of application Ser. No. 11/895,618 filed Aug. 24, 2007, now U.S. Pat. No. 8,286,180, which is a continuation-in-part of application Ser. No. 11/591,801 filed Nov. 2, 2006, now abandoned, which claims priority under 35 U.S.C. 119 from GB Application No. 0613289.8 filed Jul. 4, 2006, the disclosures of which are hereby incorporated by reference.

FIELD OF THE INVENTION

This invention relates to a method and apparatus for synchronisation of execution threads on a multi-threaded processor.

BACKGROUND TO THE INVENTION

In our U.S. Pat. No. 6,971,084 there is described a multi-threaded processor which has several threads executing at the same time. These threads may be executed at different rates as the processor allocates more or less time to each one. There will in such a system be a plurality of data inputs, each supplying a pipeline of instructions for an execution thread. A control means routes the execution thread to an appropriate data processing means which is then caused to commence execution of the thread supplied to it. A determination is made repeatedly as to which routing operations and which execution threads are capable of being performed and subsequently at least one of the operations deemed capable of being performed is commenced. The system may be modified by including means for assigning priorities to threads so that execution of one or more threads can take precedence over other threads where appropriate resources are available.

Systems embodying the invention of U.S. Pat. No. 6,971,084 will typically have a number of threads executing at the same time on one or more different processors. The threads may be executed at different rates as the processors on which they are executing allocate more or less time to them in accordance with resource availability.

In some applications it is desirable to coordinate execution of two or more threads such that sections of their programs execute simultaneously (in synchronisation) for example to manage access to shared resources. This can be achieved by the utilisation of a synchronisation point provided in an execution thread which a processing means recognises as a point at which it may have to pause. Each free running thread will execute up to a synchronisation point and then pause. When all threads are paused at a synchronisation point they are synchronised and can be restarted simultaneously.

As with all software, the execution threads may have flow control branches and loops within them and it is therefore not always possible to predict which execution path a thread will take through a program. Therefore if one thread branches and thereby avoids a synchronisation point, a thread with which it is intended to be synchronised may be stalled indefinitely at a corresponding synchronisation point. As the first thread is not executing that section of the program it will never reach the relevant synchronisation point.

Alternatively, in such a situation, one thread which has branched to miss a first synchronisation point may unintentionally synchronise with a second thread at a second synchronisation point. For example, if the thread includes a branch point "if . . . end" branch which contains a synchronisation point A within it, and a synchronisation point B after it, then threads which do not skip the "if . . . end" branch would pause at the synchronisation point A within the branch and those that do skip it would pause at synchronisation point B after the branch.

SUMMARY OF THE INVENTION

Preferred embodiments of the invention provide a method and apparatus for synchronisation of execution threads on a multi-threaded processor in which each thread is provided with a number of synchronisation points. When any thread reaches a synchronisation point it waits for other threads with which it is intended to be synchronised to reach the same synchronisation point and is then able to resume execution. When a thread branches over a section of code, which includes a synchronisation point, it is paused and flagged as having branched. Subsequently any threads which reach a synchronisation point wait only for threads which have not been flagged as having branched. This ensures that any threads which have not branched, synchronise with each other.

Threads which are paused at a branch target (i.e. after branching) are permitted to resume execution when any other thread reaches the same point through normal execution without branching. If all other threads have branched then execution resumes when all threads reach that branch target.

Preferably it is possible to predict at any branch point whether any synchronisation points will be missed if the branch is taken. If no synchronisation points are skipped then there is no requirement for the branching thread subsequently to pause.

BRIEF DESCRIPTION OF THE DRAWINGS

FIG. 3 shows a fragment of code used in an embodiment of the invention; and,

In FIG. 1, a plurality of data inputs 4 are provided to a media control core 2. Each data input provides a set of instructions for a thread to be executed. The media control core 2 repeatedly determines which threads are capable of being executed, in dependence on the resources available. The media control core 2 is coupled to a multi-banked cache 12 with a plurality of cache memories 14. This is used for storage of data which may be accessed by any of the executing threads.

Figure 1:
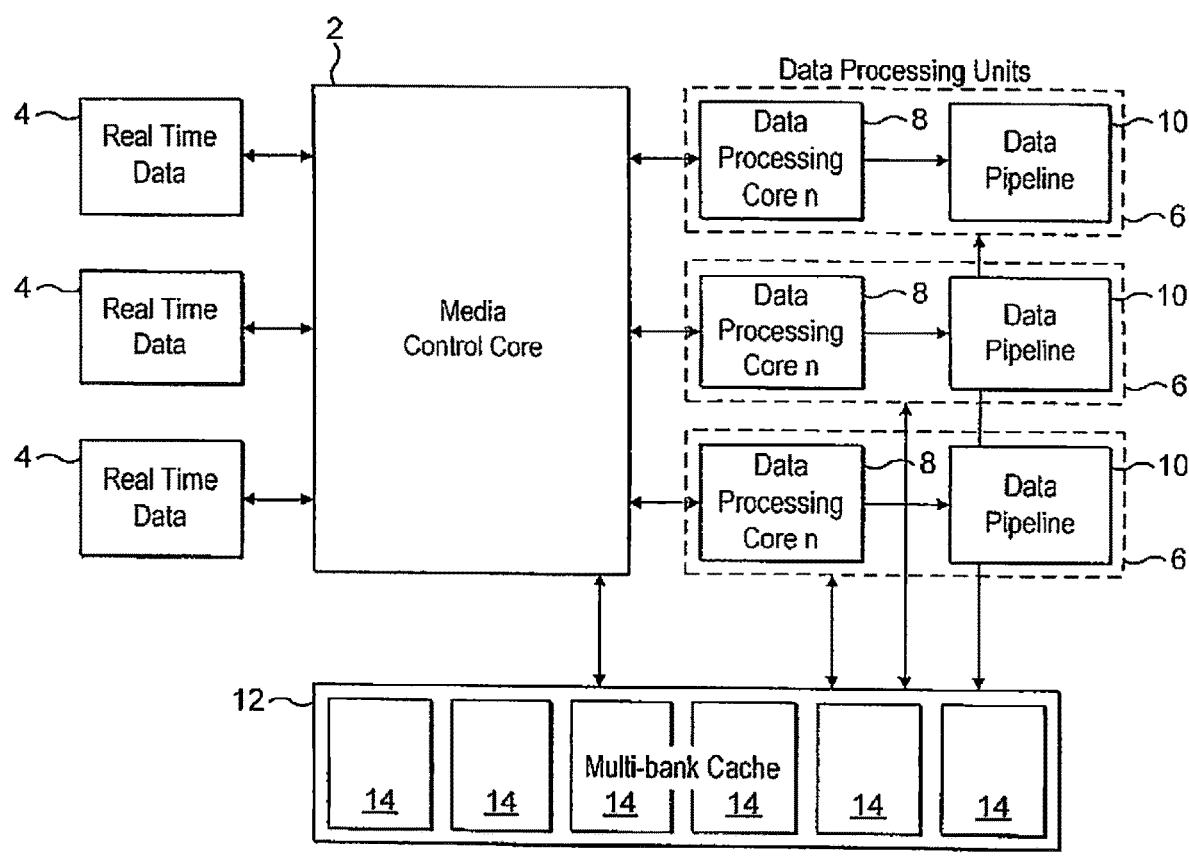
FIG. 1 shows a block diagram of an example of a multi-threaded processor system.

A plurality of data processing pipeline units 6 is also connected to the media control core (MCC). There may be one or many of these and there will usually be fewer than the number of data inputs 4. Each pipeline unit 6 comprises a data processing core 8 and the downstream data pipeline 10 which performs any post processing required and provides the output.

The inputs and outputs to the system FIG. 1 may be real time video inputs and outputs, real time audio inputs and outputs, data sources, storage devices etc.

The media control core is a multi-threading unit which directs data from the inputs 4 to the data processing cores 8 or to storage and subsequently provides data for outputs. It is configured so that it can switch tasks at every clock cycle. Thus, on each clock cycle it checks which of the execution threads provided at the inputs 4 have all the resources required for them to be executed, and of those, which has the highest priority. Execution of the threads which are capable of being performed can then commence.

The resource checking is performed repeatedly to ensure that threads do not stall.

In accordance with embodiments of the invention, threads which are to be synchronised are able to indicate to the media control when they encounter synchronisation points so that synchronisation can be controlled by the media control core. Thus, when two or more threads which are intended to be synchronised are supplied to the media control core it is able to perform the operations necessary to synchronise those threads. The media control core 2 processes instructions for the program of each thread and monitors the state of each thread running. In addition to the normal executing or stalled states (waiting for resource availability) there are two special states (these are known as "wait for sync start" and "wait for sync end"). In these states no processing is done since execution is paused at that point.

Figure 2:
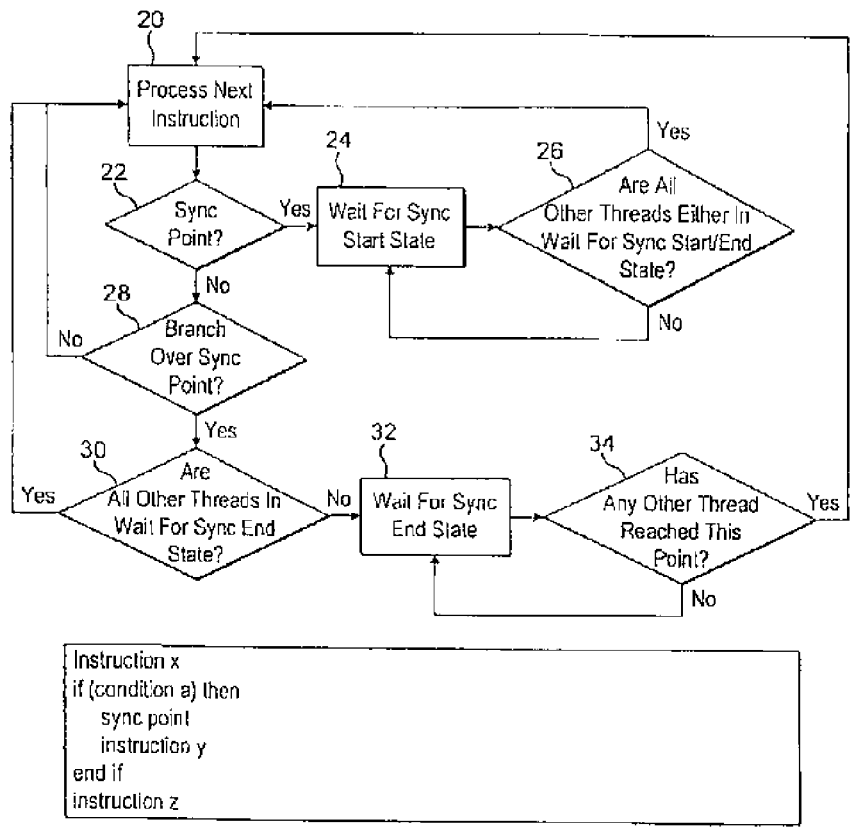
FIG. 2 shows a flow diagram of the decision logic required for each thread in an embodiment of the invention.

The operation of the synchronisation points is explained in more detail with reference to FIG. 2. At 20, the media control core identifies that for a particular thread, it can now process the next instruction. Its first task is to determine whether or not that instruction includes a synchronisation point at 22. If there is a synchronisation point, then the executing thread moves to the wait for sync start state at 24. This state causes the media control core to repeatedly examine all other threads to determine whether or not they are in the wait for sync start/end states at 26. If they are not all in one of these states, then the system loops around repeatedly checking until all the threads to be synchronised are stalled. Once all other threads are in one of these states, the media control core can again process the next instruction at 20 and again looks for a sync point at 22. If the determination is that there is not a sync point, a determination is made as to whether or not a thread has branched over a sync point at 28. If no such branch has taken place, then the system goes back to 20 to process the next instruction.

If the system has branched over a sync point then bits are set to indicate to the MCC that a branch over a synchronisation point has occurred and a determination is made as to whether all other threads are in a wait for sync end state at 30. If they are, indicating that the branched thread is the only thread preventing recommencement of execution of the other threads, then the next instruction is processed at 20. If all other threads are not at the wait for sync end state then a loop is entered in which the executing thread is in the wait for sync end state at 32 and determines whether other threads have reached the sync end state point at 34. Once another thread has reached this point, the system loops back to process the next instruction at 20.

The detection of synchronisation points and branch points can take place in the media control core 2 in response to data included in the thread by its compiler. Alternatively, the information can be fed back to the media control core via the data processing cores 8 as they process instructions.

A distinction between the wait for sync start date and the wait for sync end state is that the wait for sync start state occurs when a synchronisation point is processed in the normal flow of a thread.

The wait for sync end state is entered if a branch instruction is processed that is known to branch over a sync point whether or not any other thread reaches the same point in the program. Thus, once a thread has branched over a sync point, it is effectively stalled until another thread has caught up with it in execution, i.e., has reached the same point in the program.

An example code fragment which traces through a possible execution sequence of four threads is shown in FIG. 3. Threads 0 and 2 execute a conditional code whilst codes 1 and 3 skip it. The effect of this code block with the sync point when embodying the invention is to pause all threads in either wait for sync start or wait for sync end states after entering the conditional loop or branching around it. At this point, threads 0 and 2 can resume execution by executing instruction Y. They should preferably be restarted simultaneously and executed at the same rate. Threads 1 and 3 cannot resume execution until either thread 0 or 2 reaches instruction Z.

It will be appreciated from the above that the present invention does enable multiple executing threads to be executed with branch points whilst maintaining synchronisation.

Figure 4:
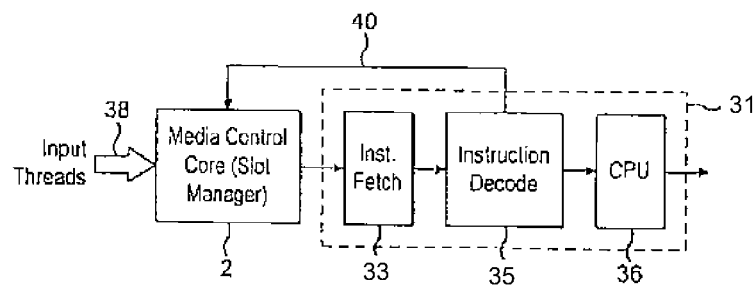
FIG. 4 shows a block diagram of the MCC and data processing unit of FIG. 1.

A more detailed block diagram of the MCC 2 and a data processing unit 31 is shown in FIG. 4. In this, the MCC 2 receives a plurality of input threads 38. for example, it may receive 16 input threads. Of these 16 threads, 4 are to be synchronised and include appropriate synchronisation points in their instructions.

The MCC 2 will determine if the resources required for the four threads to be synchronised are available and if they are will commence execution of these threads. In a single processing unit system as shown in FIG. 4 the threads will be provided cyclically to the data processing unit 31, for example, one instruction in turn from each thread will be supplied to the data processing unit. An instruction fetch unit 33 fetches instructions from each thread in turn as provided by the MCC 2 and supplies them to an instruction decode unit 35, which decodes them and can then send them onward to a CPU 36.

The MCC 2 includes a bank of registers, one register for each thread it is managing. Each register stores a plurality of bits indicating the status of various aspects of its respective thread. The registers each include bits which are set to indicate whether a thread is in a wait for sync start or wait for sync end state. This data enables the MCC 2 to monitor the synchronisation state of the threads and determine whether or not the threads are currently synchronised or are waiting to reach synchronisation by being in a wait for sync start or wait for sync end state.

The MCC 2 receives data to update the registers it contains for each thread via a feedback path 40 from the instruction decode unit 35. This is able to recognise when a thread branches over a section of code and therefore that this thread needs to be put in a wait for sync end state while it waits for the other threads to reach the end of the branch or a sync point within the branch. It also recognises when a thread executes the code which can be branched over and puts the thread into a wait for sync end state at the end of the section of code, or at a sync point within the section of code. This state is also fed back to the MCC 2 and stored in the register for that thread.

When a thread is put into a wait for sync start/end state, the MCC recognises that other threads could therefore be executing in the slot that had previously been assigned to the stalled thread. It therefore switches in another of the 16 threads it has available for execution. When the threads to be synchronised have all reached the synchronisation point, this is recognised and the MCC 2 will determine whether or not the resources they require to continue execution are available, and whether any other threads have a higher priority for execution. At an appropriate time, execution of the threads to be synchronised is recommenced.

When a thread for use in an embodiment of this invention is compiled, the compiler detects where sync points occur in the thread and includes instructions in the compiled thread to indicate the presence of a sync point to the MCC. Where there are branches, the compiler must determine whether a branch includes a sync point. If it does the alternative branches, if they do not contain corresponding sync points, have instructions included in them to indicate to the MCC that they have branched over a sync point, and to pause execution at the end of the branch.

What is claimed is:

1. A method for synchronising execution of a plurality of threads on a multi-threaded processor, each thread being provided with a number of synchronisation points, the method comprising:
pausing execution of a first thread of the plurality of threads on the multi-threaded processor when the first thread reaches a synchronisation point,
waiting for all other threads of the plurality of threads with which the first thread is intended to be synchronised to reach a corresponding synchronisation point, and
subsequently resuming execution, the method further comprising:
pausing execution of a second thread of the plurality of threads on the multi-threaded processor at a branch target following a branch which branches over a section of code for execution by threads of the plurality of threads which includes the synchronisation point, the branching of the second thread thereby avoiding the synchronisation point, until at least one of the other threads reaches the branch target.

2. The method of claim 1, in which execution of the first thread is paused in a wait for synchronisation start state.

3. The method of claim 1, in which execution of the second thread is paused in a wait for synchronisation end state.

4. The method of claim 1, further comprising repeatedly checking whether the threads with which one or both of the paused first thread and the paused second thread is to be synchronised have also paused.

5. The method of claim 4, in which repeatedly checking whether the threads have paused comprises checking the status of at least one bit in a status register for each of the threads.

6. The method of claim 1, in which execution of the second thread is paused at the branch target until at least one of the other threads reaches the branch target without branching.

7. The method of claim 1, in which execution of the second thread is paused at the branch target until all of the other threads reach the branch target by branching.

8. The method of claim 1, further comprising, when the first thread is paused or the second thread is paused, switching the paused thread with another thread of the plurality of threads which is available for execution.

9. Apparatus for synchronising execution of a plurality of threads on a multi-threaded processor, each thread being provided with a number of synchronisation points, the apparatus comprising:
a controller configured to
pause execution of a first thread of the plurality of threads on the multi-threaded processor when the first thread reaches a synchronisation point, until all other threads of the plurality of threads with which the first thread is intended to be synchronised reach a corresponding synchronisation point, and cause the first thread to subsequently resume execution,
the controller being further configured to
pause execution of a second thread of the plurality of threads on the multi-threaded processor at a branch target following a branch which branches over a section of code for execution by threads of the plurality of threads which includes the synchronisation point, the branching of the second thread thereby avoiding the synchronisation point, until at least one of the other threads reaches the branch target.

10. The apparatus of claim 9, in which the controller is further configured to cause execution of the first thread to be paused in a wait for synchronisation start state.

11. The apparatus of claim 9, in which the controller is further configured to cause execution of the second thread to be paused in a wait for synchronisation end state.

12. The apparatus of claim 9, in which the controller is further configured to repeatedly check whether the threads with which one or both of the paused first thread and the paused second thread is to be synchronised have also paused.

13. The apparatus of claim 12, in which the controller is further configured to check the status of at least one bit in a status register for each of the threads.

14. The apparatus of claim 9, in which the controller is further configured to pause execution of the second thread until at least one of the other threads reaches the branch target without branching.

15. The apparatus of claim 9, in which the controller is further configured to pause execution of the second thread until all of the other threads reach the branch target by branching.

16. The apparatus of claim 9, in which the controller is further configured to switch the paused first thread or the paused second thread with another thread of the plurality of threads which is available for execution.

* * * * *